United States Patent [19]

Ishiguro et al.

[11] Patent Number: 4,935,172

[45] Date of Patent: Jun. 19, 1990

[54] METHOD FOR PRODUCING MICROCAPSULES

[75] Inventors: Mamoru Ishiguro; Yoshihide Murakami, both of Takasago, Japan

[73] Assignee: Mitsubishi Paper Mills, Ltd., Tokyo, Japan

[21] Appl. No.: 193,532

[22] Filed: May 13, 1988

[30] Foreign Application Priority Data

May 15, 1987 [JP] Japan .................................. 62-118368
May 18, 1987 [JP] Japan .................................. 62-122339

[51] Int. Cl.$^5$ ............................................. B01J 13/02
[52] U.S. Cl. ................... 264/4.7; 427/213.34; 428/402.21
[58] Field of Search ...................... 264/4.7; 428/402.21

[56] References Cited

U.S. PATENT DOCUMENTS

| | | | |
|---|---|---|---|
| 4,089,802 | 5/1978 | Foris et al. | 428/402.21 |
| 4,100,103 | 7/1978 | Foris et al. | 428/402.21 |
| 4,233,178 | 11/1980 | Fuchigami | 264/4.7 |
| 4,525,520 | 7/1985 | Shioi et al. | 428/402.21 |
| 4,533,599 | 8/1985 | Okumura et al. | 264/4.7 |
| 4,601,863 | 7/1986 | Shioi et al. | 264/4.7 |
| 4,711,749 | 12/1987 | Kosaka et al. | 264/4.7 |

FOREIGN PATENT DOCUMENTS

| | | | |
|---|---|---|---|
| 2543019 | 9/1984 | France | 264/4.7 |
| 20885 | 7/1970 | Japan | 264/4.7 |
| 54-25277 | 2/1979 | Japan . | |
| 55-47139 | 4/1980 | Japan . | |
| 56-51238 | 5/1981 | Japan . | |
| 2006709 | 5/1979 | United Kingdom | 264/4.7 |
| 2192169 | 1/1988 | United Kingdom | 264/4.7 |

Primary Examiner—Matthew A. Thexton
Assistant Examiner—John M. Covert
Attorney, Agent, or Firm—Cushman, Darby & Cushman

[57] ABSTRACT

A method for producing microcapsules with an aminoaldehyde polycondensate as a wall material in an aqueous medium containing a water-soluble polymer is disclosed. As the water-soluble polymer, there is used a terpolymer comprising (A) α-methylstyrene, (B) styrene and (C) maleic anhydride or a quadripolymer comprising (A) α-methylstyrene, (B) styrene, (C) maleic anhydride and (D) an esterification product of maleic anhydride. This method is especially useful for making pressure-sensitive copy paper.

7 Claims, No Drawings

METHOD FOR PRODUCING MICROCAPSULES

BACKGROUND OF THE INVENTION

The present invention relates to a method for producing microcapsules and, more particularly, to a method for producing microcapsules using aminoaldehyde polycondensate as wall material according to in-situ method.

Microcapsules comprise a wall of uniform thin film which surrounds and confines liquid, solid or gas as a fine particle of 1 μm—several hundreds μm and those containing, for example, colorless or colored dyes, medicines, agricultural agents, perfumes or feeding stuffs have been industrially commercialized.

Of these uses, application to pressure-sensitive copy sheet is most popular. That is, an over sheet comprising a support coated, on back side, with microcapsules containing hydrophobic liquid in which a colorless electron donating dye is dissolved and an under sheet comprising a support coated, on front side, with colorless electron accepting developer are brought into overlying relationship so that both the coatings contact with each other and pressure is applied thereto by writing to rupture the microcapsules to release the encapsulated materials. As a result, the color former and developer contact with each other and a colored material is formed on the surface of the under sheet by chemical reaction.

As mentioned above, a thin film is formed around a material having a certain specific property and thereby it is also possible to confine the specific property. The enclosed material can be released by rupture of the film when it is needed.

The following methods have been known for preparation of microcapsules:

Coacervation method which uses ionic complex of gelatin and anionic protective colloid.

Interfacial polymerization method which utilizes film-forming reaction at interface between internal and external phases.

In-situ method which forms water-insoluble resin film on the surface of oil droplets from external phase (aqueous phase) [cf. Japanese Patent Publication (Kokoku) No. 60-2100, U.S. Pat. No. 4,100,103 (ethylene-maleic anhydride resin), Japanese Patent Laid-Open (Kokai) No. 54-25277, U.S. Pat. No. 4,233,178 (styrene-maleic anhydride resin), Japanese Patent Laid-Open (Kokai) No. 55-47139 (combination of styrene-maleic anhydride/ vinyl acetate-maleic acid), Japanese Patent Laid-Open (Kokai) No. 56-51238, U.S. Pat. No. 4,533,599 (partial esterified product of styrene-maleic anhydride)].

The above encapsulation methods can afford microcapsules having dense film superior in protection of enclosed core material and are industrially widely used, but still suffer from many problems in production and quality.

That is, coacervation method has the following problems.

(i) Adjustment of pH, temperature and time for reaction and operation are complicated.

(ii) Since it is difficult to obtain microcapsule slurry of more than 20% in concentration, a large quantity of water must be evaporated when used for pressure-sensitive copy sheet. Therefore, there are problems to be improved in operation speed and energy cost.

(iii) The film-forming wall materials are natural products and have a great variability in quality and price.

(iv) The microcapsules have tendency of rotting and agglomeration and cannot be stored for a long time.

These problems in coacervation method have been solved to some extent in the interfacial polymerization method. However, the interfacial polymerization method is not suitable for encapsulation of unstable materials or heat modifiable materials because highly reactive film-forming material is allowed to reacted (at relatively high temperatures).

Besides, problems in solvent resistance and water resistance remain unsolved.

In in-situ preparation method, encapsulation with various amino resins has been proposed and this is now industrially widely applied, but it still suffers from the following problems.

(i) Since water-soluble polymer material which emulsifies hydrophobic liquid as fine droplets has relatively high viscosity, the resulting microcapsule dispersion has naturally high viscosity and thus, it is difficult to obtain a microcapsule slurry having a solid content of at least 50% with good fluidity.

(ii) On the other hand, when water-soluble polymer material of low viscosity or water-soluble polymer material reduced in viscosity by dilution with a suitable solvent is used as an emulsifier, emulsion stability of hydrophobic liquid is reduced, resulting in cohesion or flocculation of the hydrophobic liquid per se.

(iii) In order to obtain physically and chemically high film strength and stability, it is necessary to employ high temperature reaction conditions or to introduce a large amount of film-forming material. When such encapsulation method susceptible to variation of conditions is employed, defective products are apt to be produced in industrial production due to a slight error in setting of conditions or unexpectable change in conditions and scope for industrial application of the products is narrowed.

SUMMARY OF THE INVENTION

The present invention aims at solving the problems in the conventional microencapsulation methods. Specifically, the object of the present invention is to provide a method for preparing microcapsules containing a hydrophobic liquid as core material by in-situ preparation method according to which a microcapsule slurry of high solids concentration and low viscosity and microcapsules having more rigid wall can be obtained even with a small amount of film-forming material.

The present invention provides a method for producing microcapsules using an aminoaldehyde polycondensate as a wall material in an aqueous medium containing a water-soluble polymer wherein a copolymer comprising (A) α-methylstyrene, (B) styrene, (C) maleic anhydride and, if necessary, (D) an esterification product of maleic anhydride is used as the water-soluble polymer.

DESCRIPTION OF THE PREFERRED EMBODIMENTS

The present invention is a method for producing microcapsules using an aminoaldehyde polycondensate in an aqueous medium containing a water-soluble polymer, characterized in that (a) a terpolymer comprising (A) α-methylstyrene, (B) styrene and (C) maleic anhydride or (b) a quadripolymer comprising (A) α-methylstyrene, (B) styrene, (C) maleic anhydride and (D) an esterification product of maleic anhydride is used as the water-soluble polymer.

The esterification products of maleic anhydride (D) are obtained by condensation reaction of maleic anhydride with alcohols and it is known by analysis that generally most of them are present as monoesterification products. As ester residues, alkyl group of 1-10 carbon atoms or aralkyl group is preferred from the points of emulsifiability and productivity of microcapsules. Examples are methyl, ethyl, propyl, butyl, octyl, decyl and benzyl groups and preferred is methyl group. Proportion (mol%) of the esterification product is preferably 2-20%. Use of it in an amount of more than 20% may cause reduction of film strength of microcapsules.

The above terpolymer and quadripolymer can be prepared by various known methods and preferred one comprises copolymerizing the monomer components in a suitable organic solvent, then removing the organic solvent and thereafter, dissolving the copolymer in an aqueous solution of a suitable pH.

Ratio of the constituting monomers is preferably as follows: For terpolymer, (A) α-methylstyrene: 2-50 mol%, (B) styrene: 5-50 mol% and (C) maleic anhydride: 30-50 mol% per 100 mols of (A)+(B)+(C), respectively, and for quadripolymer, (A) α-methylstyrene: 2-50 mol%, (B) styrene: 5-50 mol%, (C) total amount of maleic anhydride and an esterification product of maleic anhydride: 30-50 mol% and (D) esterification product of maleic anhydride: 2-20 mol% per 100 mol% of (A)+(B)+(C)+(D), respectively.

There are no special problems if the ratios of the monomers vary within the above ranges, but if any one of the monomers is outside the above range in its amount, there occur phenomena unfavorable for production of microcapsules and quality of the resulting microcapsules.

Specifically, when amount of maleic anhydride or total amount of maleic anhydride and esterification product of maleic anhydride is more than 50 mol%, not only regular copolymerization reaction of the constituting components is difficult to take place, but also when the resulting copolymer is used as an emulsifier in the form of aqueous solution, there may occur separation of hydrophobic liquid or presence of microparticles of hydrophobic liquid during emulsification step. On the other hand, when total amount of maleic anhydride and esterification product of maleic anhydride is less than 30 mol%, the copolymerization reaction proceeds relatively smoothly, but the product becomes insoluble in water or its viscosity increases sharply. This is not preferred for emulsification step. When amount of (B) styrene is more than the range mentioned above (i.e., when amount of α-methylstyrene is smaller), regid film cannot be obtained and when amount of α-methylstyrene is greater, viscosity of water-soluble polymer tends to increase and this hinders emulsification or incomplete capsules are produced.

Molecular weight of the water-soluble polymer used in the present invention is preferably less than one million in terms of polystyrene measured by gel permeation chromatography and viscosity is preferably 20-2000 cps (10% aqueous solution of pH 4.0) measured by Brookfield viscosity at 25° C.

The method of production of microcapsules according to the present invention comprises basically the following five steps.
(1) Preparation of water-soluble polymer.
(2) Preparation of core material.
(3) Preparation of aminoaldehyde pre-condensate.
(4) Preparation of emulsion.
(5) Formation of aminoaldehyde resin.

In the step (1) of preparation of water-soluble polymer, concentration of water-soluble polymer solution which is determined depending on its viscosity and emulsion stability is preferably 3-15%. PH of the aqueous solution is normally set in the acidic region of 7 or less and is preferably 6 or less.

Adjustment of pH is effected with bases such as sodium hydroxide, potassium hydroxide and ammonia or acids such as acetic acid, hydrochloric acid and oxalic acid.

As the core material in (2) there may be used, for example, solution or dispersion of various dyes, pharmaceuticals, agricultural agents, liquid crystals, perfumes and pigments. Especially when microcapsules are used for pressure-sensitive copy sheet, colorless organic dyes are used as core material and as examples of solvents used therefor, mention may be made of diallyalkanes, alkylnaphthalenes, dibenzylbenzene derivatives, alkylbenzenes, paraffins, cycloparaffins, chlorinated paraffins and various esters, mineral oils and vegetable oils.

As the aminoaldehyde resins in (3), there are known urea-formalin resin, melamine-formalin resin, benzoguanamine resin, butylated melamine resin, butylated urea resin and the like and especially preferred is melamine-formalin resin. Pre-condensates of these resins can be easily obtained by reaction under conditions of suitable concentration, pH and temperature. Commercially available products may also be used.

This step (3) is not essential because in some case respective compounds (amino compound and formalin) can be used.

Step (4) is emulsification of a solution containing core material.

A hydrophobic solution containing core material is added to aqueous solution of the water-soluble polymer obtained in step (1) with vigorous stirring to obtain emulsion of desired average particle size.

To this emulsion are added the aminoaldehyde pre-condensate obtained in (3) and/or respective compounds (amino compound and formalin).

Ratio (weight ratio) of aminoaldehyde precondensate and hydrophobic solution containing core material varies depending on kinds of core material and film forming material or use, but is preferably in the range of 1:3-1:40.

The step (5) of production of aminoaldehyde resin, namely, step of reaction is generally carried out at 50-90° C. and usually is completed in 1-3 hours. It is possible to use a catalyst for acceleration of the reaction at the time of formation of resin and a treating agent for excess formaldehyde after completion of the reaction.

Microcapsule slurry obtained by the method of the present invention is prepared at high concentration and besides is low in viscosity and has further rigid film. Especially when microcapsules are used for carbonless copy paper, coating operability is very good and coating at high concentration and high speed is possible.

The present invention will be illustrated by the following examples where part is by weight.

EXAMPLE 1

[Preparation of water-soluble polymer]

160 Grams of methyl isobutyl ketone was added to 98 g (1 mol) of maleic anhydride and the mixture was heated to 110-115° C. Then, at the same temperature, thereto was added dropwise from separate dropping funnels of 52 g (0.5 mol) of styrene, 59 g (0.5 mol) of α-methylstyrene and a solution of 2.2 g of tert-butyl peroxybenzoate in 50 g of methyl isobutyl ketone over a period of 1.5 hour in nitrogen atmosphere. The mixture was kept at said temperature for 2 hours and then thereto was added dropwise a solution of 2.2 g of tert-butyl peroxy 2-ethylhexanoate in 10 g of methyl isobutyl ketone over a period of 30 minutes to complete the reaction and this was kept for 1 hour. The polymeric liquid was cooled to lower than 100° C., followed by adding thereto 150 g of water and 75 g (0.9 mol) of 48% sodium hydroxide, blowing water vapor thereinto by conventional method and removing methyl isobutyl ketone. Thereafter, water was added thereto to adjust solid concentration to 8% to obtain a water-soluble polymer. Properties of the polymer were pH=5.0 and Brookfield viscosity (25° C.)=60 cps.

[Microencapsulation]

As a core material of microcapsules, a solution was prepared by dissolving 3 parts of Crystal Violet Lactone (CVL) and 1 part of Benzoyl Leuco Methylene Blue (BLMB) in 96 parts of HIZOL SAS N-296 (aromatic solvent manufactured by Nippon Oil Chemical Co., Ltd.).

220 Parts of the above hydrophobic liquid was gradually added to 180 parts of the water-soluble polymer solution obtained hereabove as aqueous solution of emulsifier with vigorous stirring and stirring was continued until a volume average particle size of 5 microns was obtained. Thus, an emulsion was obtained.

Separately, 11 parts of melamine, 21.2 parts of 37% aqueous formaldehyde solution and 28.2 parts of water were mixed and to the mixture was added sodium hydroxide to adjust pH to 9, followed by heating the mixture to cause dissolution, thereby to obtain an aqueous solution of melamine-formaldehyde pre-condensate. This aqueous solution was added to said emulsion and stirring was continued for 2 hours at 70° C. to complete the reaction.

After confirmation of formation of microcapsules, the reaction product was cooled to room temperature and pH was increased to 9 with aqueous sodium hydroxide solution to complete microencapsulation.

To 200 parts of the resulting microcapsule liquid were added 30 parts of wheat starch powder and 100 parts of 10% aqueous polyvinyl alcohol solution and the mixture was coated on a wood-free paper of 40 g/m² at a coverage of 5 g/m² (dry basis) to obtain an over sheet (CB paper) for carbonless pressure-sensitive recording paper. This was brought into overlying relationship with a commercially available under sheet for carbonless pressure-sensitive recording paper (under sheet No-40 of Mitsubishi NCR having a basis weight of 40 g/m²) and an impression was made thereon by a typewriter to obtain letters of beautiful color.

EXAMPLE 2

Water-soluble polymer was prepared in the same manner as in Example 1 except that amount of styrene was 20.8 g (0.2 mol) and that of α-methylstyrene was 94.4 g (0.8 mol).

Properties of the resulting water-soluble polymer were solid concentration: 7.5%, Brookfield viscosity (25° C.): 150 cps and pH: 5.0.

Using this water-soluble polymer as an emulsifier solution, encapsulation and preparation of CB sheet were performed in the same manner as in Example 1.

EXAMPLE 3

Water-soluble polymer was prepared in the same manner as in Example 1 except that amount of styrene was 80 g (0.77 mol) and that of α-methylstyrene was 18.2 g (0.15 mol).

Properties of the resulting water-soluble polymer were solid concentration: 8.0%, Brookfield vescosity (25° C.): 105 cps and pH: 4.6.

Using this water-soluble polymer as an emulsifier solution, encapsulation and preparation of CB sheet were performed in the same manner as in Example 1.

EXAMPLE 4

To the emulsion of hydrophobic liquid obtained in Example 1 were added 42 parts of aqueous solution containing 14 parts of urea and 29 parts of 37% aqueous formaldehyde solution, followed by stirring at 60° C. for 2 hours to complete the reaction.

After confirmation of formation of microcapsules, the reaction product was cooled to room temperature and pH thereof was increased to 9 with aqueous sodium hydroxide solution to complete microencapsulation. CB sheet was prepared in the same manner as in Example 1.

COMPARATIVE EXAMPLE 1

220 Parts of hydrophobic liquid of Example 1 was added to 180 parts of 8.0% aqueous solution of ethylene-maleic anhydride copolymer (EMA-31 of Monsant Co.) adjusted to pH 3.5 as a water-soluble polymer solution and emulsification was performed in the same manner as in Example 1.

Next, 13 parts of melamine, 25.1 parts of 37% aqueous formaldehyde solution and 132 parts of water were mixed, followed by dissolution by heating at pH 9.0 to obtain a melamine formaldehyde pre-condensate. This pre-condensate was added to said emulsion, followed by stirring at 70° C. for 2 hours to complete the reaction.

Using the resulting microcapsule slurry, an over sheet (CB sheet) for carbonless pressure-sensitive copy paper was prepared in the same manner as in Example 1.

Microcapsules and over sheets for pressure-sensitive copy paper obtained in Examples 1-4 and Comparative Example 1 were evaluated by the following methods.

1. Solid content: Solid concentration of capsule emulsion after dry-heat treated at 105° C. for 3 hours is measured.

2. Viscosity: Viscosity of capsule emulsion of 54-55% concentration (45% for Comparative Example 1) measured by Brookfield viscometer at 20° C.

3. Blue spot: Capsule emulsion is diluted with water to 20% in solid concentration and directly coated on color developer coating on a CF sheet (under sheet) and dried. The number of spots appearing per 100 m² is counted. With increase of this number of spots, encapsulation is inferior and this number is preferably 5 or less for practical use.

4. Color stain due to static pressure: CB sheet and CF sheet are superposed so that the coated sides of both sheets may face with each other and a static pressure of 20 kg/cm² is applied thereon for 30 seconds. Then, reflectance of the surface of the CF sheet is measured. The greater value means stronger microcapsule film.

5. Heat resistance: CB sheet and CF sheet are superposed so that the coated sides of both sheets may face with each other and a light load of 50 g/m² is applied thereon. They are left to stand for 3 hours in an atmosphere of 140° C. and reflectance of the surface of the CF sheet is measured. The greater value indicates the higher heat resistance and the high strength of film.

Reflectance of CF sheet for evaluation of color stain and heat resistance is measured by color difference meter ND101DP of Nihon Denshoku Kogyo Co. and expressed by the value calculated from $$\frac{\text{Reflectance of colored part}}{\text{Reflectance of untreated part (background part)}} \times 100\ (\%).$$

The results of evaluation made by the above methods are shown in Table 1.

TABLE 1

| | Solid concentration of slurry % | Viscosity CPS (20° C.) | Blue spots (number) | Color stain by static pressure | Heat resistance |
|---|---|---|---|---|---|
| Example 1 | 55 | 85 | 2 | 96.5 | 98.8 |
| Example 2 | 54 | 135 | 3 | 94.8 | 98.0 |
| Example 3 | 55 | 90 | 4 | 95.5 | 97.2 |
| Example 4 | 55 | 70 | 1 | 93.2 | 96.4 |
| Comparative Example 1 | 45 | 155 | 4 | 90.1 | 94.3 |

EXAMPLE 5

[Preparation of water-soluble polymer]

98 Grams (1 mol) of maleic anhydride and 10 g of methyl isobutyl ketone were charged in a 5-liter flask equipped with a reflux condenser, a thermometer, a nitrogen introduction pipe and two dropping funnels and heated to 60° C. under nitrogen. At this temperature, thereto was added dropwise 6.4 g (0.2 mol) of methanol over a period of minutes and this was kept at that temperature for 1 hour to obtain esterification product of maleic anhydride.

160 Grams of methyl isobutyl ketone was added to this flask and the content was heated to 110–115° C. and at this temperature, thereto were added dropwise 52 g (0.5 mol) of styrene, 59 g (0.5 mol) of α-methylstyrene and a solution of 2.2 g of tert-butyl peroxybenzoate in 50 g of methyl isobutyl ketone from separate dropping funnels over a period of 1.5 hours. After kept at that temperature for 2 hours, thereto was added dropwise a solution of 2.2 g of tert-butyl peroxy-2-ethylhexanoate in 10 g of methyl isobutyl ketone over a period of 30 minutes and this was kept at that temperature for 1 hour to complete the polymerization. The polymeric liquid was cooled to lower than 100° C. and thereto were added 150 g of water and 1.3 g (0.86 mol) of 48% sodium hydroxide, followed by blowing thereinto water vapor and removing methyl isobutyl ketone by conventional method. Then, water was added thereto to adjust solid concentration to 8% to obtain a water-soluble polymer, which had the following properties; pH: 5.2 and Brookfield viscosity (25° C.): 32 cps.

[Microencapsulation]

As a core material of microcapsules, a solution was prepared by dissolving 3 parts of Crystal Violet Lactone (CVL) and 1 part of Benzoyl Leuco Methylene Blue (BLMB) in 96 parts of HIZOL SAS N-296 (aromatic solvent manufactured by Nippon Oil Chemical Co., Ltd.).

220 Parts of said hydrophobic liquid was gradually added to 180 parts of the water-soluble polymer solution obtained hereabove as aqueous solution of emulsifier with vigorous stirring and stirring was continued until a volume average particle size reached 5 microns to obtain an emulsion.

Separately, 11 parts of melamine, 21.2 parts of 37% aqueous formaldehyde solution and 28.2 parts of water were mixed and to the mixture was added sodium hydroxide to adjust pH to 9, followed by heating the mixture to cause dissolution to obtain an aqueous solution of melamine-formaldehyde pre-condensate. This aqueous solution was added to said emulsion and stirring was continued for 2 hours at 70° C. to complete the reaction.

After confirmation of formation of microcapsules, the reaction product was cooled to room temperature and pH was increased to 9.0 with aqueous sodium hydroxide solution to complete the microencapsulation.

To 200 parts of the resulting microcapsule liquid were added 30 parts of wheat starch powder and 100 parts of 10% aqueous polyvinyl alcohol solution and the mixture was coated on a wood-free paper of 40 g/m² at a coverage of 5 g/m² (dry basis) to obtain an over sheet (CB sheet) for carbonless pressure-sensitive recording paper. This was brought into overlying relationship with a commercially available under sheet for carbonless pressure-sensitive recording paper (under sheet No-40 of Mitsubishi NCR having a basis weight of 40 g/m²) and an impression was made thereon by a typewriter to obtain letters of beautiful color.

EXAMPLE 6

Water-soluble polymer was prepared in the same manner as in Example 5 except that amount of styrene was 20.8 g (0.2 mol) and that of α-methylstyrene was 94.4 g (0.8 mol) and amount of methanol used at preparation of the esterification product was 3.2 g (0.1 mol) per 98 g (1 mol) of maleic acid.

Properties of the resulting water-soluble polymer were solid concentration 8.0%, Brookfield viscosity (25° C.): 65 cps and pH: 5.0.

Using this water-soluble polymer as an emulsifier solution, preparations of microcapsules and CB sheet were performed in the same manner as in Example 5.

EXAMPLE 7

Water-soluble polymer was prepared in the same manner as in Example 5 except that amount of styrene was 62.4 g (0.6 mol), that of α-methylstyrene was 47.2 g (0.4 mol) and that of methanol added at the preparation of the esterification product was 9.6 g (0.3 mol) per 98 g (1 mol) of maleic anhydride.

Properties of the resulting water-soluble polymer were solid concentration: 8.0%, Brookfield viscosity (25° C.): 58 cps and pH: 5.1.

Using this water-soluble polymer as an emulsifier solution, microcapsules and CB sheet were prepared in the same manner as in Example 5.

COMPARATIVE EXAMPLE 2

220 Parts of hydrophobic liquid of Example 5 was added to 180 parts of 8.0% aqueous solution of ethylene-maleic anhydride copolymer (EMA-31 of Monsant Co.) adjusted to pH 3.5 as a water-soluble polymer and emulsification was performed in the same manner as in Example 5. Next, 14 parts of melamine, 27 parts of 37% aqueous formaldehyde solution and 133 parts of water were mixed, followed by dissolution with heating at pH 9.0 to obtain a melamine-formaldehyde pre-condensate. This pre-condensate was added to said emulsion, followed by stirring at 70° C. for 2 hours to complete the reaction. Using the resulting microcapsule slurry, an over sheet (CB sheet) for carobonless pressure-sensitive copy paper was prepared in the same manner as in Example 5.

Microcapsules and over sheets for pressure-sensitive copy paper obtained in Examples 5-7 and Comparative Example 2 were evaluated in the same manner as in Examples 1-4 and Comparative Example 1. The results are shown in Table 2.

TABLE 2

|  | Solid concentration of slurry % | Viscosity CPS (20° C.) | Blue spots (number) | Color stain due to static pressure | Heat resistance |
| --- | --- | --- | --- | --- | --- |
| Example 5 | 55 | 48 | 2 | 96.3 | 97.9 |
| Example 6 | 55 | 75 | 1 | 95.4 | 98.0 |
| Example 7 | 55 | 63 | 2 | 94.8 | 98.0 |
| Comparative Example 2 | 45 | 210 | 4 | 91.0 | 94.6 |

As is clear from the results in Examples, according to the present invention, microcapsules of high strength, low viscosity and high solid content can be obtained even with small amount of film forming material.

Especially when the microcapsules according to the present invention are applied to pressure-sensitive copy paper, coatability is superior because viscosity is low and pressure-sensitive copy paper superior in color formation and stain resistance can be obtained.

Further, according to the present invention, there is obtained unexpected effect of shortening of emulsification time, that is, the time required for making the hydrophobic liquid to droplets of desired size can be markedly reduced as compared with conventional methods. This is very advantageous for efficient production of microcapsules.

What is claimed is:

1. A process for producing microcapsules which comprises
    adding a hydrophobic solution containing one or more core materials to an aqueous solution of a water-soluble polymer obtained by copolymerizing (A) 2-50 mole % of alpha-methylstyrene, (B) 5-50 mole % of styrene, and (C) 30-50 mole % of maleic anhydride, a total being 100 mole %, to obtain an emulsion of desired average particle size, adding an amino-aldehyde pre-condensate to the resulting emulsion, and subjecting the resulting mixture to reaction with heating to form microcapsules.

2. A process according to claim 1, wherein the amino-aldehyde pre-condensate is melamine-formaldehyde precondensate.

3. A process for producing microcapsules which comprises
    adding a hydrophobic solution containing one or more core materials to an aqueous solution of a water-soluble polymer obtained by copolymerizing (A) 2-50 mole % of alphamethylstyrene, (B) 5-50 mole % of styrene, (C) maleic anhydride and (D) an esterification product of maleic anhydride, a total of (C) and (D) being 30-50 mole % and (D) being 2-20 mole %, a total of (A), (B), (C) and (D) being 2-20 mole %, a total of (A), (B), (C) and (D) being 100 mole %, to obtain an emulsion of desired average particle size,
    adding an amino-aldehyde pre-condensate to the resulting emulsion, and
    subjecting the resulting mixture to reaction with heating to form microcapsules.

4. A process according to claim 3, wherein the amino-aldehyde pre-condensate is melamine-formaldehyde precondensate.

5. A process according to claim 3, wherein the esterification produce of maleic anhydride is methyl maleate.

6. A process according to claim 1, wherein the amino-aldehyde pre-condensate and the hydrophobic solution containing one or more core materials are used in the weight ratio of 1:3 to 1:40 (the former: the latter).

7. A process according to claim 1, wherein the reaction is carried out at 50-90° C.

* * * * *